United States Patent
Iwanaga et al.

[11] Patent Number: 5,261,295
[45] Date of Patent: Nov. 16, 1993

[54] TEMPERATURE RESPONSIVE LINE PRESSURE CONTROL ARRANGEMENT FOR AUTOMOTIVE AUTOMATIC TRANSMISSION

[75] Inventors: Kazuyoshi Iwanaga, Atsugi; Takashi Shibayama, Isehara, both of Japan

[73] Assignee: Nissan Motor Co., Ltd., Yokohama, Japan

[21] Appl. No.: 592,928

[22] Filed: Oct. 4, 1990

[30] Foreign Application Priority Data

Oct. 11, 1989 [JP] Japan .................... 1-264635

[51] Int. Cl.⁵ .............................. F16H 5/64
[52] U.S. Cl. ..................................... 74/844
[58] Field of Search ............ 74/844, 866, 867; 340/449, 450.3; 364/424.03, 424.1; 192/82 T

[56] References Cited

U.S. PATENT DOCUMENTS

| | | | |
|---|---|---|---|
| 3,859,626 | 1/1975 | Baratti | 340/449 X |
| 4,148,232 | 4/1979 | Moriya | 74/867 X |
| 4,488,456 | 12/1984 | Taga et al. | 74/867 X |
| 4,563,918 | 1/1986 | Sugano | 74/867 X |
| 4,680,992 | 7/1987 | Hayasaki et al. | 74/869 |
| 4,730,521 | 3/1988 | Hayasaki et al. | 74/867 |
| 4,733,581 | 3/1988 | Hasegawa et al. | 74/866 X |
| 4,779,489 | 10/1988 | Haley | 74/844 |
| 4,807,495 | 2/1989 | Wallace | 74/844 |
| 4,847,768 | 7/1989 | Schwartz et al. | 340/449 X |
| 4,870,581 | 8/1989 | Ito et al. | 364/424.1 |
| 4,939,957 | 7/1990 | Asano et al. | 74/867 X |
| 4,970,492 | 11/1990 | King | 340/450.3 |
| 4,998,449 | 3/1991 | Baba et al. | 74/844 |
| 5,014,575 | 5/1991 | Fujiwara et al. | 74/866 |
| 5,022,284 | 6/1991 | Shimei | 74/844 |
| 5,029,492 | 7/1991 | Kiuchi | 74/844 |
| 5,058,014 | 10/1991 | Saitou et al. | 74/866 |

FOREIGN PATENT DOCUMENTS

| | | |
|---|---|---|
| 2124024 | 11/1972 | Fed. Rep. of Germany . |
| 3240153 | 5/1984 | Fed. Rep. of Germany . |
| 60-179553 | 9/1985 | Japan . |
| 60-179554 | 9/1985 | Japan . |
| 62-62047 | 3/1987 | Japan . |
| 2-3754 | 1/1990 | Japan ............... 74/844 |
| 3-125067 | 5/1991 | Japan ............... 74/844 |

*Primary Examiner*—Leslie A. Braun
*Assistant Examiner*—Khoi Q. Ta
*Attorney, Agent, or Firm*—Foley & Lardner

[57] ABSTRACT

The temperature of the oil (hydraulic fluid) which is used to engage the friction elements of the transmission is sensed. When the temperature exceeds a predetermined level, the level of line pressure which is used during shifting (lower than that used during non-shifting operations) is increased to compensate for the loss in viscosity and lubricative properties of the oil.

5 Claims, 8 Drawing Sheets

FIG.6

| SOLENOID<br>GEAR | SOLENOID 1 | SOLENOID 2 |
|---|---|---|
| FIRST | ON | ON |
| SECOND | OFF | ON |
| THIRD | OFF | OFF |
| FOURTH | ON | OFF |

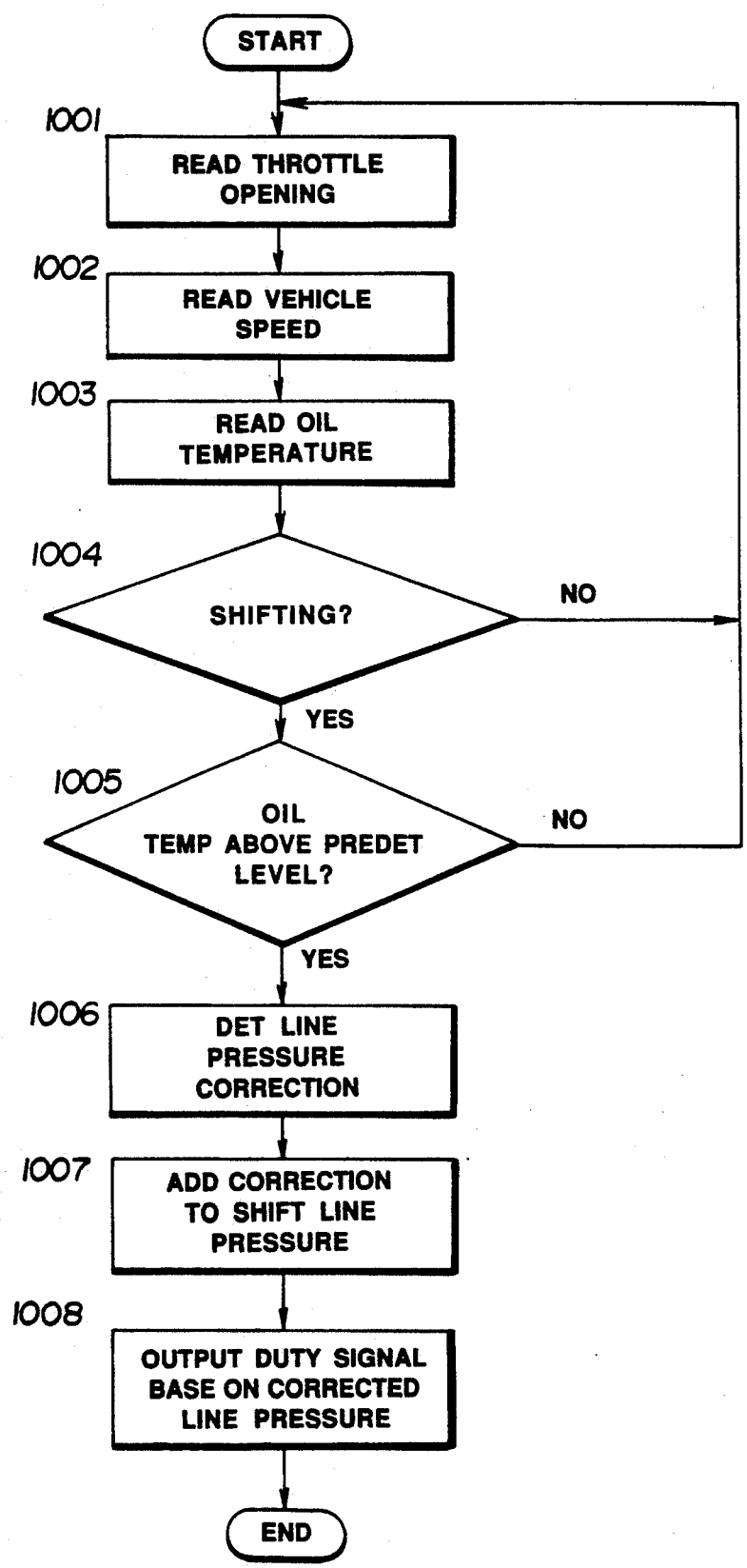

TEMPERATURE RESPONSIVE LINE PRESSURE CONTROL ARRANGEMENT FOR AUTOMOTIVE AUTOMATIC TRANSMISSION

BACKGROUND OF THE INVENTION

1. Field of the Invention

The present invention relates generally to line pressure control arrangements for automatic automotive transmissions and more specifically to a line pressure control arrangement which is responsive to the temperature of the oil being used to engage the friction elements.

2. Description of the Prior Art

JP-A-62-62047 discloses a transmission control arrangement wherein the level of line pressure which is used to engage and disengage the various friction elements of the transmission is varied in accordance with the load on the engine as indicated by the position of the throttle valve.

Further, in order to reduce friction element engagement shock the above arrangement is such as to increase the pressure slowly during the initial stage of the engagement and thus permit an amount of slip to occur.

However, the lubricative and viscosity properties of the oil used to engage the friction elements reduces with increase in temperature. Accordingly, when the temperature of the oil rises even though the pressure level is being adjusted in accordance with the engine load, a problem occurs that the reduced lubricative and viscosity properties of the oil tends to permit excessive slippage between the elements of the friction element or elements which are being engaged.

This of course leads to increased wear rate and tends to shorten the working life of the friction element in addition to inducing an undesirable change in the shifting characteristics of the transmission.

SUMMARY OF THE INVENTION

It is an object of the present invention to provide a transmission line pressure control arrangement which senses the temperature of the oil being used to engage the friction elements and which modifies the load responsive pressure adjustment in a manner which compensates for the changes in temperature.

In brief, the above object is achieved by an arrangement wherein the temperature of the oil (hydraulic fluid) which is used to engage the friction elements of the transmission is sensed. When the temperature exceeds a predetermined level, the level of line pressure which is used during shifting (lower than that used during nonshifting operations) is increased to compensate for the loss in viscosity and lubricative properties of the oil.

More specifically a first aspect of the invention comes in a line pressure control arrangement for an automotive automatic transmission which includes a plurality of selectively engageable friction elements, a pump and means for regulating the output of the pump to form a hydraulic line pressure, the arrangement featuring: a temperature sensor which senses the temperature of hydraulic fluid used to engage the friction elements; line pressure correction means for modifying the level of the line pressure during transmission shifting, the line pressure control means being responsive to the temperature sensor for increasing the level of the line pressure when the temperature of the oil is sensed as being above a predetermined level.

A second aspect of the present invention comes in an automotive vehicle which features: an engine; a transmission, the transmission being operatively connected with the engine, the transmission including a source of hydraulic line pressure; means for controlling the level of the line pressure; first sensor means for sensing a parameter which varies with the load on the engine; second sensor means for sensing a parameter which varies with the speed of the vehicle; third sensor means for sensing the temperature of the hydraulic fluid which is used to selectively engage a plurality of friction elements which form part of a transmission gear train; and a control circuit, the control circuit being operatively connected with the first, second and third sensor means and the line pressure control means, the control circuit including means responsive to the first and second signals for determining if a shift is required, and responsive to the third sensor means for determining if the temperature of the hydraulic fluid which is being used to engage the friction elements of the transmission is above a predetermined level, the control circuit being arranged to reduce the level of line pressure during shifting as compared with the level applied for the same engine load during non-shifting transmission operation, the control circuit being arranged to modify the amount by which the line pressure is reduced during shifting when the temperature of the hydraulic fluid is above the predetermined level.

BRIEF DESCRIPTION OF THE DRAWINGS

FIG. 6 is a table which shows the manner first and second shift control solenoids are energized in order to produce first to fourth forward gear ratios;

FIG. 9 is a flow chart which depicts the steps which characterize the operation of the present invention.

DETAILED DESCRIPTION OF THE PREFERRED EMBODIMENTS

Figure 1:
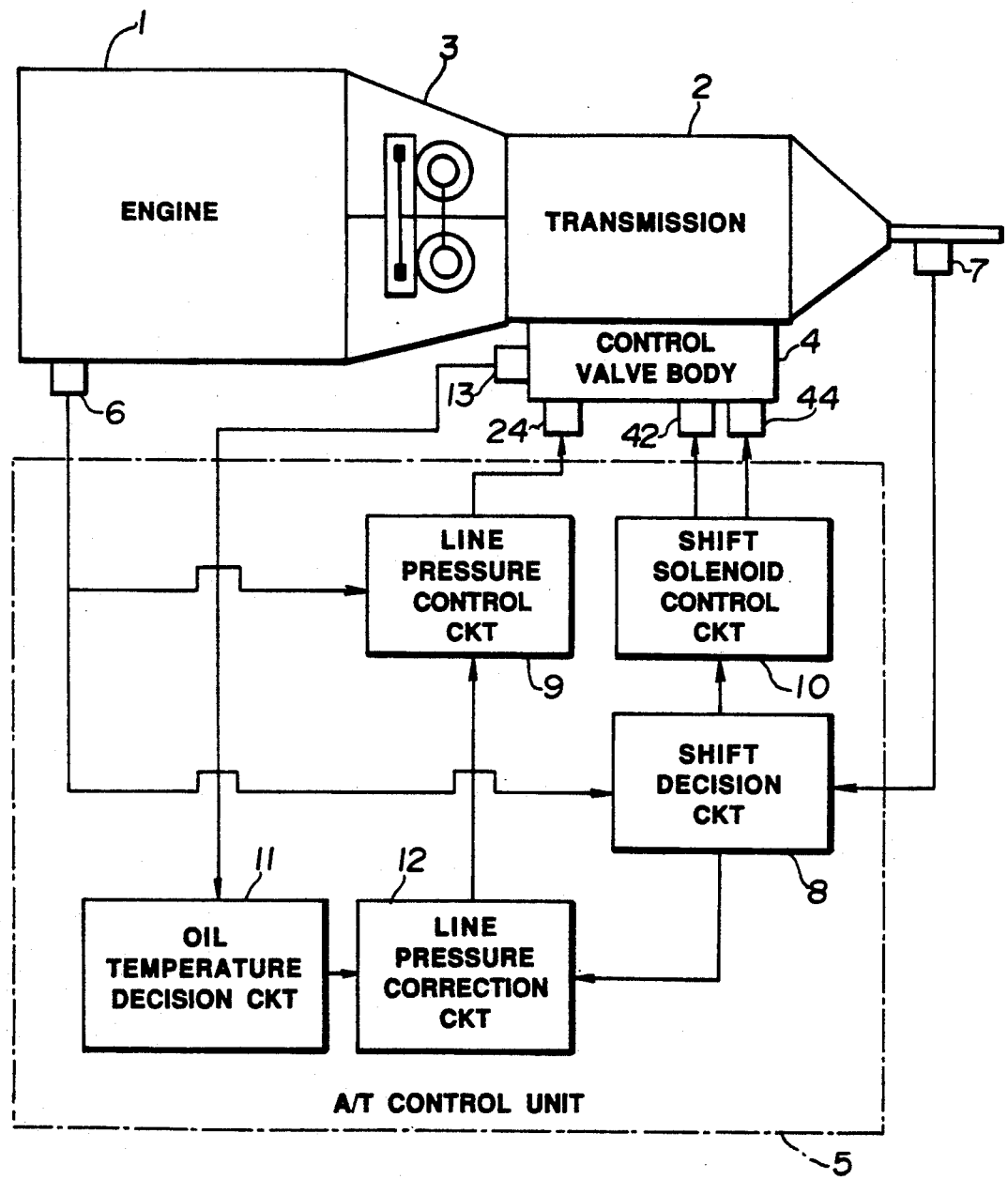
FIG. 1 is a schematic diagram depicting the control arrangement which characterizes the present invention.

FIG. 1 shows and engine/transmission power train arrangement to which the present invention is applied. In this arrangement an engine 11 is operatively connected to an automatic transmission 21 by way of a torque converter 3'.

Figure 2:
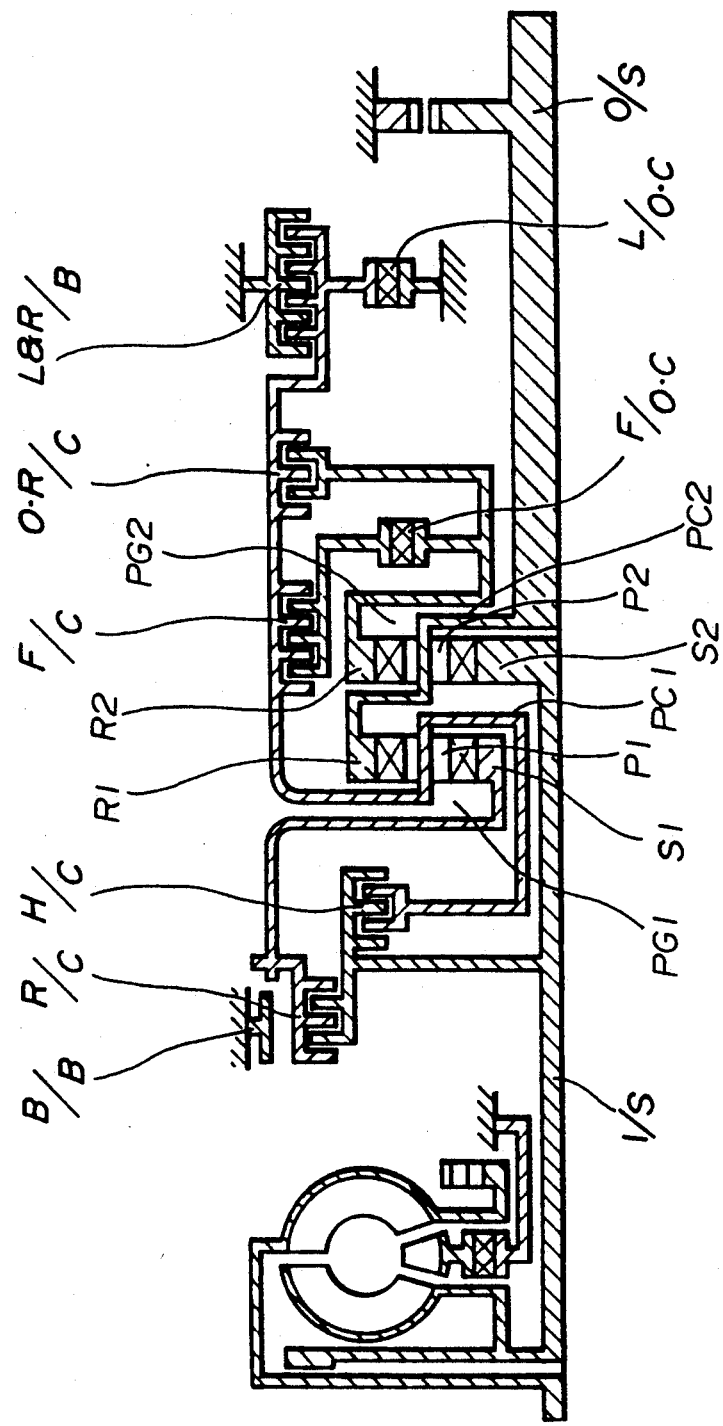
FIG. 2 is a sectional view showing the gear train used in the transmission shown in FIG. 1.

As shown in FIG. 2, the transmission 2' in this instance comprises first and second planetary gear units PG1 and PG2 which are arranged in tandem. As shown, the forward planetary gear PG1 comprises a front sun gear S1, front pinion gears P1, a front internal or ring gear R1 and a pinion gear carrier PC1. The rear planetary gear similarly comprises a sun gear S2, front pinion gears P2, a front internal or ring gear R2 and a pinion gear carrier PC2.

A transmission input shaft I/S is arranged to be selectively connectable with the front sun gear S1 by way of a reverse clutch R/C, and selectively connectable with the front pinion gear carrier PC1 by way of a high clutch H/C.

The front planetary gear carrier PC1 is selectively connectable with the rear ring gear R2 by way of a forward clutch F/C; the front sun gear S1 is connectable with the transmission housing through a band brake B/B, the front carrier PC1 is selectively connectable with the transmission housing through a low and reverse brake L&R/B.

In addition to this, a forward overrunning clutch F/O is arranged between the forward clutch F/C and the rear ring gear R2; while a low overrunning clutch L/O is arranged between front planetary gear carrier PC1 and the transmission housing. An overrunning clutch O.R/C provides a selective connection between front planetary gear carrier PC1 and the rear ring gear S2 and is arranged in parallel with the F/O.C.

In the gear train illustrated in FIG. 2 the forward overrunning clutch F/O.C is arranged such that the front planetary gear carrier PC1 and the rear ring gear R2 are prevented from rotating in the opposite directions while the ring gear R2 is permitted to outrun the carrier PC1.

Although not shown, when the transmission is conditioned to produce a speed lower than third and the accelerator pedal depression is below 1/16, the overrunning clutch O.R/C is engaged. This negates the function of the forward overrunning clutch F/O.C an renders engine braking possible.

The input shaft I/S is operatively connected with the crankshaft of the engine through a torque converter T/C.

The above mentioned friction elements are selectively controlled by a valve body 4'. This valve body 4' houses a plurality of spool valves, accumulators and orifice arrangements which are arranged to control the supply of hydraulic line pressure to the servos of the above listed friction elements. The valve body 4' also comprises three solenoid valves, two of which (42, 44) control the shifting of the transmission and the other (24) which controls the level of line pressure.

For disclosure relating to such a type of arrangement, reference may be had to U.S. Pat. No. 4,730,521 issued on Mar. 15, 1988 in the name of Hayasaki et al and to U.S. Pat. No. 4,680,992 issued on Jul. 21, 1988 in the name of Hayasaki et al. Reference may also be had to copending U.S. patent application Ser. No. 07/336,430, filed on Apr. 11, 1989 in the name of Narita, now U.S. Pat. No. 4,972,738, issued Nov. 27, 1990.

In brief, this latter mentioned application discloses an arrangement wherein during non-shift (non-transitory) modes of transmission operation, the line pressure is controlled according to a first control schedule. Upon a shift being initiated a second control schedule is used. The use of this schedule is maintained until such time as the ratio of the transmission input shaft rotational speed to the transmission output shaft rotational speed reaches a predetermined limit whereafter a third control schedule is utilized. Control is switched from the third control schedule to the first one upon the expiration of a predetermined period which is timed from the point in time a decision that a shift between gears of the transmission should be implemented.

Figures 3, 4:
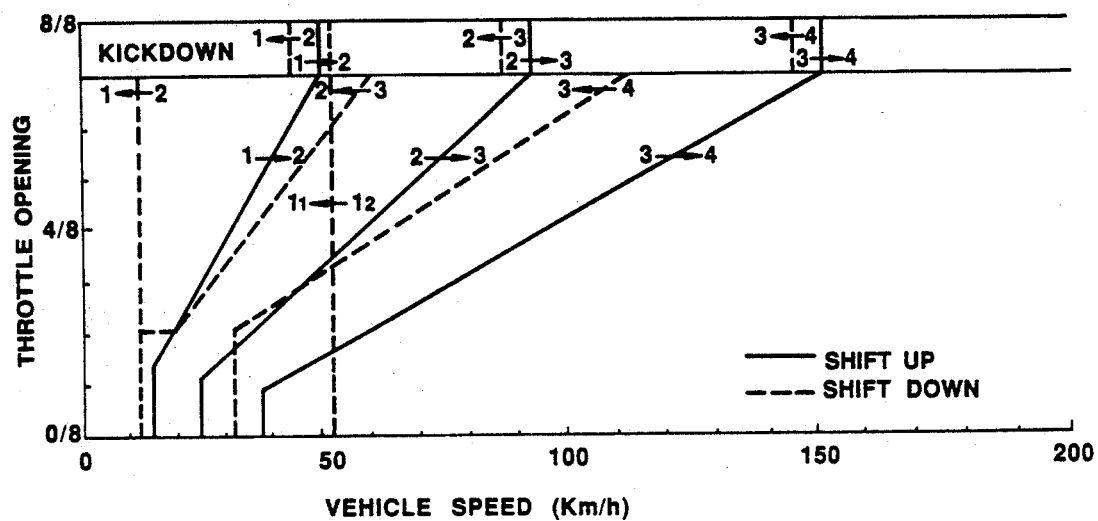
FIG. 3 is a shift schedule according to which the the transmission shown in FIG. 2 is controlled.
FIG. 4 is a table showing the relationship between the friction elements and the gears which are produced by the engagement of the same.

In the instant embodiment the shifting control is arranged to follow the schedule depicted in FIG. 3 and such as to produce four forward gears and one reverse by engaging the friction elements in the manner shown in FIG. 4. It should be noted that in FIG. 4 the circles indicate which friction elements are engaged to produce the respective gear ratio.

Figure 5A:
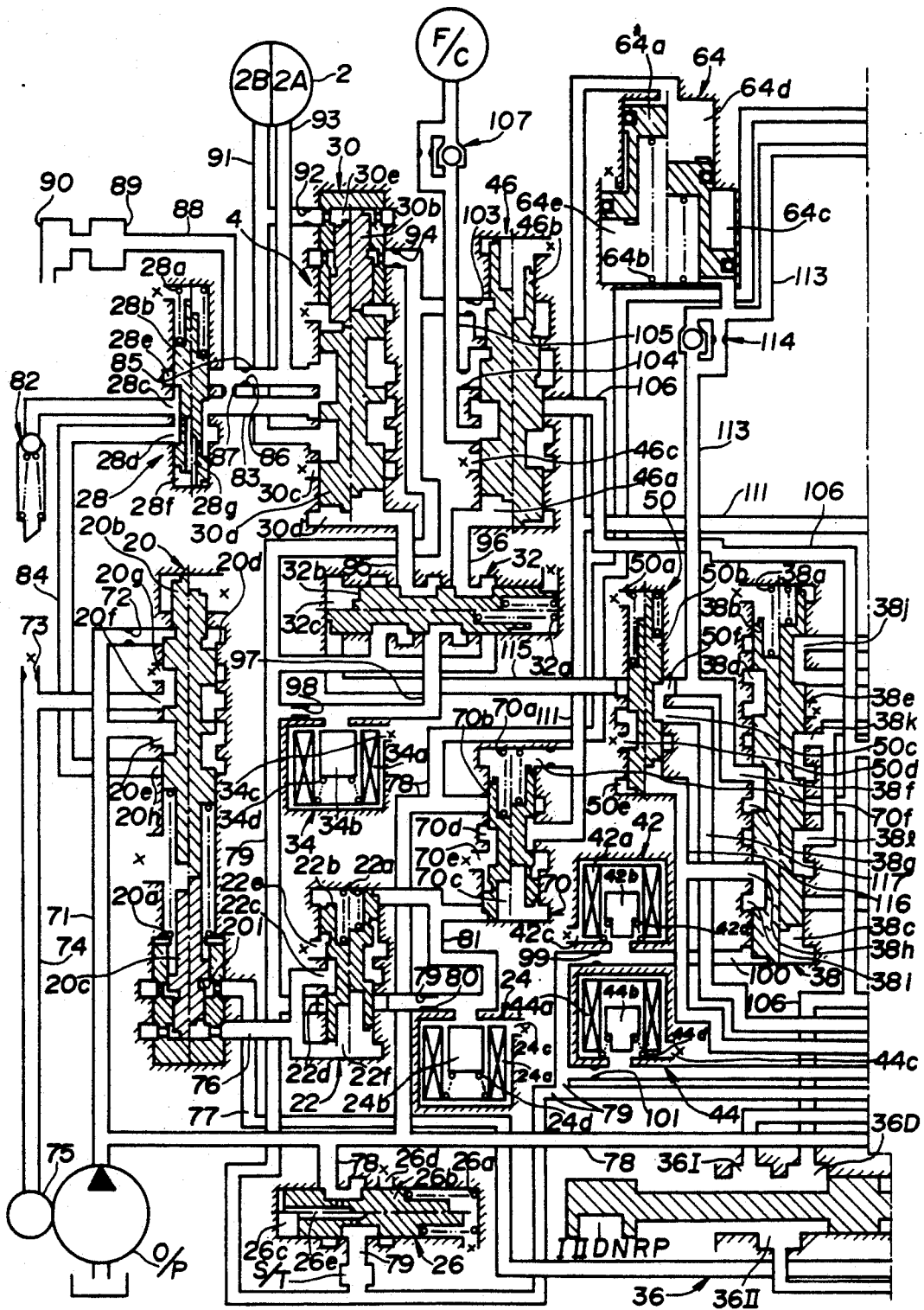
FIGS. 5A and 5B show a hydraulic spool valve control system utilized to control the transmission gear train shown in FIG. 2.
Figure 5B:
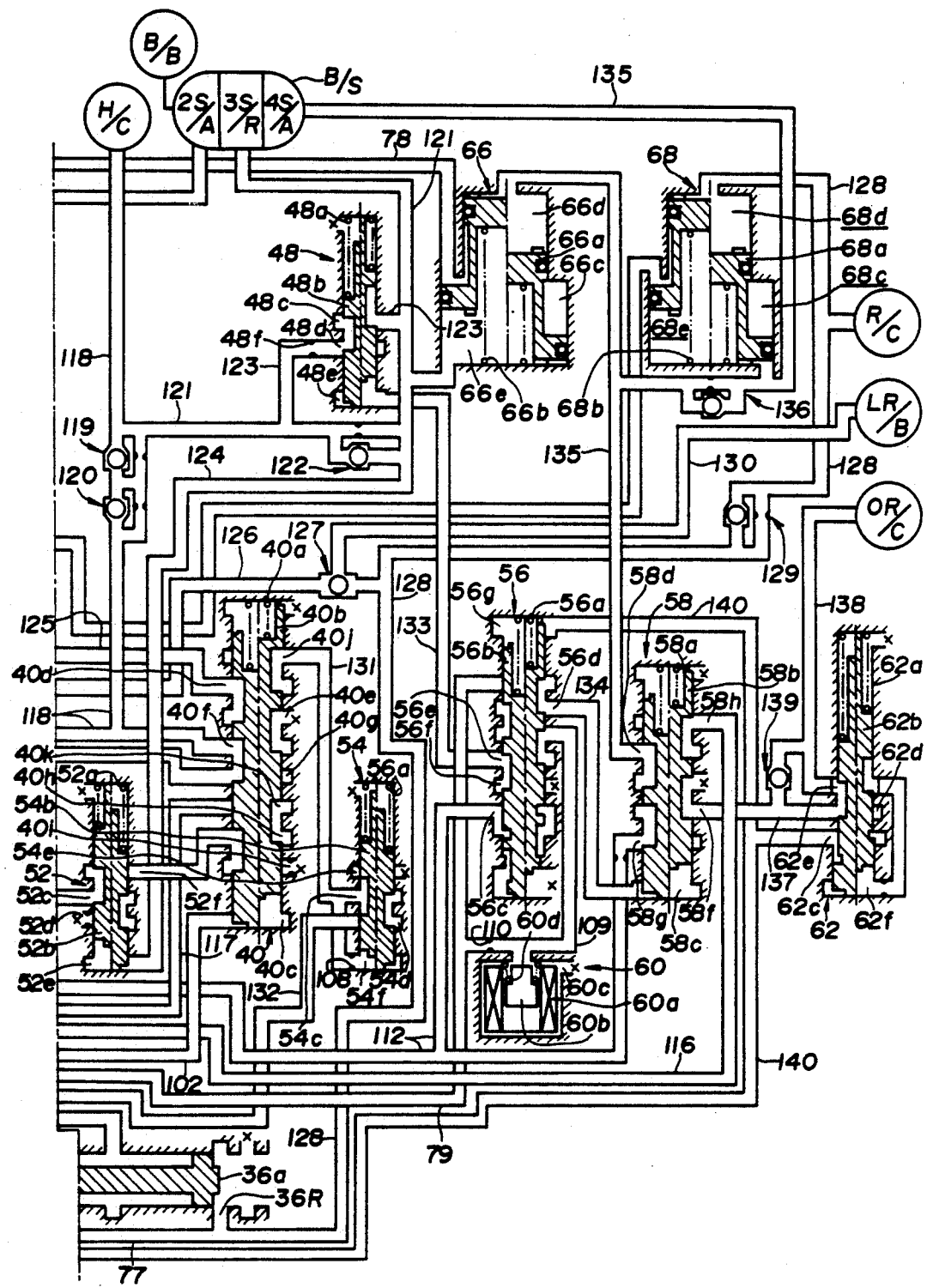

FIGS. 5A and 5B show details of the control circuit which is included in the valve body 211A of the instant embodiment. This circuit includes a pressure regulator valve 20, a pressure modifier valve 22, a line pressure solenoid valve 24, a pilot valve 26, a torque converter regulator valve 28, a lock up control valve 30, a shuttle valve 32, a lock up solenoid 34, a manual valve 36, a first shift valve 38, a second shift valve 40, a first shift solenoid valve 42, a second shift solenoid valve 44, a forward clutch control valve 46, a 3-2 timing valve 48, a 4-2 relay valve 50, a 4-2 sequence valve 52, a first range pressure reduction valve, a shuttle valve 56, an overrunning clutch control valve 58, a third shift solenoid valve 60, an overrunning clutch pressure reduction valve 62, a second speed servo apply pressure accumulator 64, a third speed servo release pressure accumulator 66, a fourth speed servo apply pressure accumulator 68 and an accumulator control valve 70.

In the above described type of transmission, the servo B/S of band brake B/B is constructed in a manner wherein irrespective of the supply of line pressure into a second speed servo apply chamber 2S/A, upon pressurization of a third speed release chamber 3S/R, the band brake is conditioned to assume a released state. Further, irrespective of the pressures prevailing in the 2S/A and 3S/R chambers, upon supply of line pressure into a fourth speed apply chamber 4S/A the band brake is applied.

The switching of the first and second shift valves 38, 40 which is controlled by selectively conditioning the first and second shift control solenoids 42, 44 to assume ON and OFF states. When conditioned to assume the ON states, the control solenoids 42, 44 permit pilot pressure to be supplied to the shift valves which accordingly assume the upshift positions indicated by the right hand half sections of the respective spools. When conditioned to assume the OFF state, the control solenoids permit the pilot pressure which is applied to the bottom of the spools to be drained and the shift valve spools are permitted to lower to their respective downshift positions.

The combinations of solenoid energizations which induces the transmission to assume first to fourth forward speeds is shown in FIG. 6. The change in energization status of the solenoids 42, 44 is induced in accordance with the shift schedule shown in FIG. 3. Viz., when a vehicle speed/engine load coordinate reaches a shift line, a shift control routine determines which shift is required and selects the particular solenoid energization pattern which is required to cause the transmission to be conditioned to produce the newly required gear ratio.

The output of an oil pump O/P which driven by the engine 1', is supplied to pressure regulator valve 20 which regulates the pump pressure and outputs a line pressure into the control circuit.

In this instance the pressure regulator valve 20 includes a pressure differential area which is exposed to the pump discharge pressure which is supplied via orifice 72 and arranged to produce a bias which acts downward as seen in the drawings. A spring 20a produces a bias which acts against the bias produced by the pressure which is applied to the above mentioned pressure differential area. Modifier pressure which is supplied via conduit 76 acts on the plug 20c in a manner to bias the same upward (as seen in the drawings). The level of line pressure varies with the equilibrium in the forces which are produced.

The level of the modifier pressure is controlled by a solenoid valve 24 which controls the operation of the pressure modifier valve 22. In this case, depending on the duty of the signal applied to the solenoid valve 24, the amount of pilot pressure which is permitted to be drained is controlled. In this instance the solenoid 24 is of the type that opens the drain when energized (ON).

Accordingly, by controlling the signal which is applied to the line pressure control solenoid 24 the level of line pressure can be controlled between minimum and maximum values.

Figure 7:
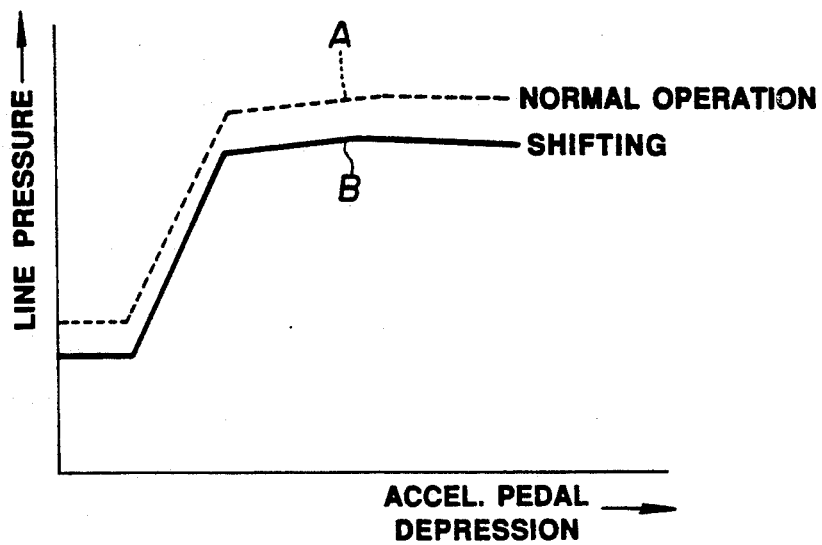
FIG. 7 is a graph which shows the manner in which the line pressure is varied with respect to engine load during normal and shifting modes of operation.

In this arrangement, under normal modes of operation, the level of line pressure is controlled in the manner indicated by the broken line trace in FIG. 7. That is to say, the level of the line pressure is stagewisely increased as the sensed throttle valve opening degree (in this case indicated by accelerator pedal depression) increases. On the other hand, during shifting, the level of the line pressure is lowered in the manner indicated by the solid line trace.

A control unit 5' is arranged to receive data inputs from an engine load sensor 61 such as a throttle position or accelerator pedal depression sensor) and vehicle speed sensor which in this case takes the form of a transmission output shaft rotational speed sensor 7', and an oil temperature sensor 13' which detects the temperature of the oil being supplied to the friction elements.

The control unit 5' contains a microprocessor which is arranged to read the inputs suppled from the above mentioned engine load sensor 6', vehicle speed sensor 7' and the oil temperature sensor 13' and process this information using one or more programs. However, for the sake of ease of understanding the control unit 5' is depicted as containing 5 different circuits 8'-12'. These circuits are schematically arranged in manner which enables the concept of the invention to be readily grasped.

More specifically, the control unit 5' is depicted as including: a shift decision circuit 8' which receives engine load and vehicle speed data from the sensors 6', 7'; a line pressure control circuit which receives a data input from the engine load sensor 6'; a shift solenoid control circuit 10' which receives a command from the shift decision circuit 8' indicative of which shift is required and which outputs the required energizing signals to the shift solenoids 42, 44; an oil temperature decision circuit which monitors the output of the oil temperature sensor 13' and determines what degree of line pressure modification is required in view of the instant oil temperature; and a line pressure correction circuit which receives inputs from the shift and temperature decision circuits 11', 12' and which outputs a signal indicative of the line pressure level which is required in view of the instant engine load/oil temperature operating conditions.

The line pressure correction circuit 12' is arranged to respond to the engine load and shift status inputs and derive a basic line pressure value. In the case of normal operation the data depicted by the broken line (stored in a suitable ROM) is used. On the other hand, during shifting modes of transmission operation data depicted by the solid line trace is used.

Figure 8:
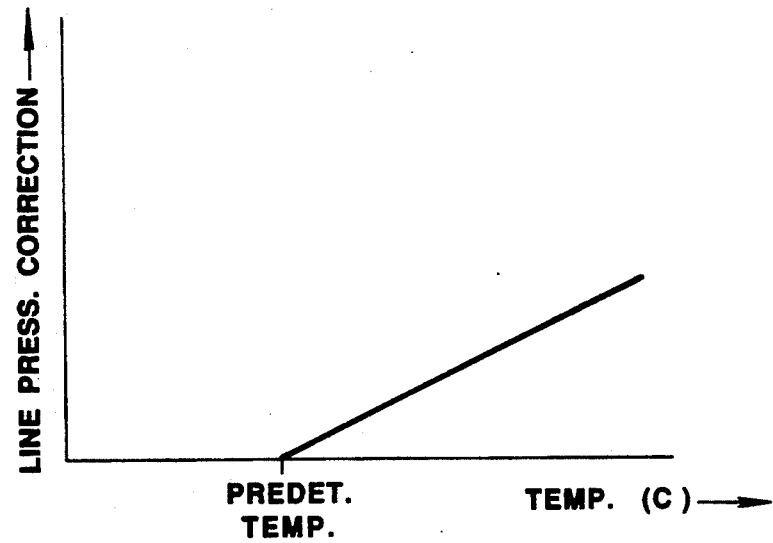
FIG. 8 is a graph which shows the manner in which an oil temperature related line pressure correction value varies with temperature in accordance with the present invention.

The oil temperature decision circuit 11' is arranged to respond to the output of the oil temperature sensor 13' and derive a suitable line correction amount using data of the nature depicted in FIG. 8. As will be noted from this figure, below a predetermined temperature the correction amount is zero. Once this predetermined level is exceeded, the correction amount increases proportionally with temperature. The correction value once derived is supplied to the line pressure correction circuit 12' wherein it is added to the basic line pressure correction value in the event that the transmission is undergoing a shift and a signal indicative of the total supplied to the line pressure control circuit 9'. It will be noted that if the transmission is not shifting, then the slippage problem which is induced the temperature change cannot occur and there is no need for correction under these conditions. The line pressure control circuit 9' responds by determining the appropriate duty cycle for the instant set of operational circumstances and generates a suitable motivating signal which is applied to the line pressure control solenoid 24.

FIG. 9 depicts the above described operation in flow chart form. The first three steps of the routine depicted in this flow chart are such as to sample the outputs of the engine load sensor 6', vehicle speed sensor 7' and oil temperature sensor 13'. It will be noted that the engine load is indicated by the engine throttle valve opening degree in this instance. However, as mentioned previously, the accelerator pedal depression degree or the like parameter can be sensed and used in lieu thereof. On the other hand, if the an anti-skid or like type of control system is utilized to control the torque generated by the engine, the throttle valve position in combination with other parameters such as ignition timing, supercharge pressure etc, may be sampled and a subroutine or routines run to determine the amount of torque which will actually be applied from the engine to the transmission.

At step 1004 it is determined if the transmission is undergoing a shift or not. This can be done by sampling the engine load and vehicle speed and determining based on a shift schedule of the nature shown in FIG. 3, if a shift is required and what kind of shift it will be. In the event that the transmission is not undergoing a shift, the routine returns.

However, if a shift is determined to be taking place, the routine goes to step 1005 wherein the oil temperature is compared with a predetermined level of the nature indicated in FIG. 8. If the oil temperature is below the predetermined level no correction is required and the routine recycles to step 1001. However, if the temperature has reached or exceeded the level the routine proceeds to step 1006 wherein data of the nature depicted in FIG. 8 is used to determine how much the line pressure should be increased to prevent the slippage problem.

At steps 1007, 1008 the temperature correction amount is added to the shift line pressure value determined on the basis of engine load and a suitable duty cycle signal is generated and supplied to the line pressure solenoid.

As will be understood, the routine shown in FIG. 9 is of the nature which requires running at predetermined intervals such as 10 ms to as to monitor the transmission undergoing a shift.

As will be appreciated from the table of FIG. 4 in the case where the transmission undergoes an upshift from 1st to 2nd speed the band brake B/B is engaged by supplying line pressure into the second speed apply chamber 2S/A of the band brake servo. With the present invention when the temperature of the oil exceeds a given level and exhibits a reduced viscosity, the level of the line pressure is increased above the level normally maintained under the instant shift/load circumstances and is possible to ensure that the brake band will be tightened with the appropriate amount of force and excessive slippage during the initial stages of the band brake application will be prevented.

When the transmission undergoes a downshift to a higher gear ratio, the engine speed is increased and the torque load which is applied to the friction elements involved is relatively low. On the other hand, during an upshift, the gear ratio is reduced and the engine speed after the shift is reduced. Under such circumstances the load on the friction elements is high.

Accordingly, it is within the scope of the present invention to increase the line pressure in response to oil temperature only during upshifting. In this case the shift decision circuit 8' is arranged to issue a signal indicative of the transmission undergoing a shift only during upshifting. Accordingly, the line pressure correction circuit does not modify the line pressure level during downshifting and the line pressure level is controlled to the normal reduced level. This reduces the amount of shift or engagement shock which is produced under this mode of operation.

It is further within the scope of the present invention to implement the control of the present invention only when the engine load is above a predetermined level. This additionally attenuates the generation of shift shock by enabling the level of line pressure to be set at the normal reduced shifting level when the engine load is relatively small.

What is claimed is:

1. A line pressure control arrangement in an automotive automatic transmission which includes a plurality of selectively engageable friction elements, a pump and means for regulating the output of the pump to form a hydraulic line pressure, comprising:
    a temperature sensor which senses the temperature of hydraulic fluid used to engage the friction elements;
    line pressure correction means for modifying the level of the line pressure during transmission shifting, said line pressure connection means being responsive to said temperature sensor for increasing the level of the line pressure when the temperature of the oil is sensed as being above a predetermined level.

2. A line pressure control arrangement as claimed in claim 1 wherein said line pressure correction means is arranged to increase the level of the line pressure only when the temperature of the oil is sensed as being above a predetermined level and the transmission is undergoing an upshift.

3. A line pressure control arrangement as claimed in claim 1, further comprising a load sensor for sensing the amount of torque which is applied to an input shaft of said transmission, and wherein said line pressure correction means is responsive to the load sensor and increases the level of line pressure only when the temperature of the oil is sensed as being above a predetermined level and the load sensor indicates that the amount of torque which is being applied to the input shaft of the transmission is above a predetermined level.

4. A control arrangement for an automotive vehicle comprising:
    an engine;
    a transmission, said transmission being operatively connected with said engine, said transmission including a source of hydraulic line pressure;
    control means for controlling a level of said line pressure, said control means further comprising:
    first sensor means for sensing a parameter which varies with a load on said engine;
    second sensor means for sensing a parameter which varies with a speed of the vehicle;
    third sensor means for sensing a temperature of the hydraulic fluid which is used to selectively engage a plurality of friction elements which form part of a transmission gear train; and
    a control circuit, said control circuit being operatively connected with said first, second and third sensor means and said line pressure control means, said control circuit including means responsive to said first and second signals for determining if a shift is required, and further responsive to said third sensor means for determining if the temperature of the hydraulic fluid which is being used to engage the friction elements of the transmission is above a predetermined level, said control circuit being arranged to reduce the level of line pressure during shifting as compared with the level applied for the same engine load during non-shifting transmission operation, said control circuit being arranged to modify an amount by which an line pressure is reduced during shifting when the temperature of the hydraulic fluid is above the predetermined level.

5. Control means as claimed in claim 4 wherein the operative connection between said engine and said transmission is established by a torque converter.

* * * * *